United States Patent
Park et al.

(10) Patent No.: US 11,913,660 B2
(45) Date of Patent: Feb. 27, 2024

(54) AIR CONDITIONING DEVICE AND CONTROL METHOD THEREOF

(71) Applicant: Samsung Electronics Co., Ltd., Suwon-si (KR)

(72) Inventors: Mooserk Park, Suwon-si (KR); Ara Cho, Suwon-si (KR); Jeahwan Go, Suwon-si (KR); Mingyu Kim, Suwon-si (KR); Byul Namkoong, Suwon-si (KR); Jieun Yeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 281 days.

(21) Appl. No.: 16/855,917

(22) Filed: Apr. 22, 2020

(65) Prior Publication Data

US 2020/0340700 A1    Oct. 29, 2020

(30) Foreign Application Priority Data

Apr. 26, 2019    (KR) ........................ 10-2019-0049350

(51) Int. Cl.
*F24F 11/56*    (2018.01)
*F24F 11/63*    (2018.01)
(Continued)

(52) U.S. Cl.
CPC .............. *F24F 11/56* (2018.01); *B01D 46/12* (2013.01); *F24F 8/80* (2021.01); *F24F 11/52* (2018.01); *F24F 11/63* (2018.01); *F24F 11/88* (2018.01)

(58) Field of Classification Search
CPC .. F24F 11/52; F24F 11/63; F24F 11/88; F24F 11/62; F24F 2110/50; F24F 11/48;
(Continued)

(56) References Cited

U.S. PATENT DOCUMENTS

| 9,451,403 B2 | 9/2016 | Lyman et al. |
| 9,681,253 B2 | 6/2017 | Lyman et al. |

(Continued)

FOREIGN PATENT DOCUMENTS

| CN | 105042765 A | * 11/2015 |
| CN | 105444350 A | 3/2016 |

(Continued)

OTHER PUBLICATIONS

European Search Report in connection with European Application No. 20167252.4 dated Sep. 4, 2020, 8 pages.
(Continued)

*Primary Examiner* — Thomas C Lee
*Assistant Examiner* — Anzuman Sharmin

(57) ABSTRACT

An air conditioning device includes an air purifier, a sensor, a communicator, and a processor. The sensor is configured to measure an air pollution level. The communicator comprises circuitry and configured to communicate with a server. The processor is configured to activate the sensor in a state where the air purifier is not driven, in response to receiving a first signal requesting an air pollution level state information from the server based on a location of a mobile terminal, transmit a second signal indicating that the air conditioning device needs to be driven to the server based on the air pollution level measured by the sensor, and drive the air purifier in response to a driving instruction received from the server.

18 Claims, 12 Drawing Sheets

(51) Int. Cl.
*F24F 11/88* (2018.01)
*F24F 11/52* (2018.01)
*B01D 46/12* (2022.01)
*F24F 8/80* (2021.01)

(58) Field of Classification Search
CPC .. F24F 11/56; F24F 3/16; F24F 1/0071; F24F 11/58; F24F 11/64; F24F 11/65; B01D 46/12; Y02B 30/70
See application file for complete search history.

(56) References Cited

U.S. PATENT DOCUMENTS

| | | | |
|---|---|---|---|
| 9,915,997 B2* | 3/2018 | Asano | G06F 1/3231 |
| 10,808,955 B2* | 10/2020 | Tripathii | F24F 11/56 |
| 10,982,873 B1* | 4/2021 | Clark | F24F 11/64 |
| 2016/0146769 A1* | 5/2016 | Zhang | G01N 33/0073 73/31.02 |
| 2018/0367843 A1 | 12/2018 | Han | |
| 2019/0220273 A1* | 7/2019 | Ye | G06F 9/44505 |
| 2019/0234632 A1* | 8/2019 | Reeder | F24F 11/0001 |
| 2020/0142470 A1* | 5/2020 | Edwards | G06Q 20/204 |
| 2020/0224915 A1* | 7/2020 | Nourbakhsh | F24F 11/54 |
| 2020/0246742 A1* | 8/2020 | Lei | B01D 46/429 |
| 2021/0236979 A1* | 8/2021 | Pham | B01D 46/444 |

FOREIGN PATENT DOCUMENTS

| | | | | |
|---|---|---|---|---|
| CN | 205119245 U | | 3/2016 | |
| CN | 108826528 A | | 11/2018 | |
| CN | 109210702 A | | 1/2019 | |
| EP | 3015779 A1 | | 5/2016 | |
| JP | 2007096462 A | * | 4/2007 | |
| JP | 2014238190 A | | 12/2014 | |
| JP | 2015124926 A | * | 7/2015 | |
| KR | 20080071000 A | * | 1/2007 | |
| KR | 10-2015-0012927 A | | 2/2015 | |
| KR | 10-2015-0101774 A | | 9/2015 | |
| KR | 10-1640065 B1 | | 7/2016 | |
| KR | 10-1668630 B1 | | 10/2016 | |
| KR | 10-1820313 B1 | | 1/2018 | |
| KR | 10-1831571 B1 | | 2/2018 | |
| KR | 10-2018-0130937 A | | 12/2018 | |
| KR | 10-2018-0137913 A | | 12/2018 | |
| WO | WO-2017007976 A1 | * | 1/2017 | ........... G06F 3/0652 |
| WO | 2018236150 A1 | | 12/2018 | |
| WO | 2019050154 A1 | | 3/2019 | |

OTHER PUBLICATIONS

Communication pursuant to Article 94(3) EPC dated Jul. 27, 2022 in connection with European Patent Application No. 20 167 252.4, 4 pages.

Korean Intellectual Property Office, "Request for the Submission of an Opinion," dated May 22, 2023, in connection with Korean Patent Application No. 10-2019-0049350, 11 pages.

China National Intellectual Property Administration (CNIPA), "The First Office Action," dated Mar. 1, 2023, in connection with Chinese Patent Application No. 202010267827.4, 25 pages.

Office Action dated Oct. 10, 2023, in connection with Chinese Patent Application No. 202010267827.4, 17 pages.

* cited by examiner

FIG. 6A

Samsung Air purifier

YOU HAVE APPROACHED NEAR TO YOUR DESTINATION. LEVEL OF INDOOR FINE DUST IS "BAD". PLEASE TURN ON AIR PURIFIER.

CANCEL  OK

FIG. 6B

Samsung Air purifier

YOU ARE AWAY FROM USAGE LOCATION.
DO YOU WANT TO TURN OFF AIR PURIFIER
FOR ENERGY SAVING?

CANCEL  OK

AIR CONDITIONING DEVICE AND CONTROL METHOD THEREOF

CROSS-REFERENCE TO RELATED APPLICATION

This application is based on and claims priority under 35 U.S.C. § 119 to Korean Patent Application No. 10-2019-0049350 filed on Apr. 26, 2019 in the Korean Intellectual Property Office, the disclosure of which is incorporated by reference herein in its entirety.

BACKGROUND

1. Field

The disclosure relates to an air conditioning device and a control method thereof, and more particularly relates to an air conditioning device purifying the indoor air and a control method thereof.

2. Description of the Related Art

Various electronic devices have been developed with development of electronic technologies. In particular, air conditioning devices capable of removing fine dust and the like in the air have been recently developed.

Generally, a user of an air conditioning device turns on the air conditioning device, when the user comes into a house from outside. But, in such a case, it is a problem that a user is negatively affected by pollutants such as fine dust and the like in the house, until the purification of the air is completed by the air conditioning device.

SUMMARY

According to an embodiment of the disclosure, there is provided an air conditioning device including an air purifier, a sensor configured to measure an air pollution level, a communicator comprising circuitry and configured to communicate with an external server; and a processor configured to activate the sensor in a state where the air purifier is not driven, in response to receiving a first signal requesting an air pollution level state information from the server based on a location of a mobile terminal, transmit a second signal indicating that the air conditioning device needs to be driven to the server based on the air pollution level measured by the sensor, and drive the air purifier in response to a driving instruction received from the server.

According to another embodiment of the disclosure, there is provided a method for controlling an air conditioning device, the method including activating a sensor in a state where an air purifier of the air conditioning device is not driven, in response to receiving a first signal requesting an air pollution level state information from a server based on a location of a mobile terminal, transmitting a second signal indicating that the air conditioning device needs to be driven to the server based on an air pollution level measured by the sensor, and driving the air purifier in response to a driving instruction received from the server.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6A illustrates a view for describing a notification related to a pollution level according to an embodiment;

FIG. 6B illustrates a view for describing a notification related to deviation according to an embodiment;

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

First, the terms used in the specification and claims have been selected general terms in consideration of functions in the disclosure. But these may vary in accordance with the intention of those skilled in the art, legal and technical interpretation, the emergence of new technologies and the like. In addition, some terms are arbitrarily selected by the applicant. Such terms may be interpreted as the meaning defined in this specification, and unless otherwise specifically defined, the terms may be interpreted based on general content of this specification and typical technical knowledge in the technical field.

In addition, in describing the disclosure, a detailed description of the related art or the configuration is summarized or omitted when it is determined that the detailed description may unnecessarily obscure a gist of the disclosure.

Further, embodiments of the disclosure is described with reference to the accompanying drawings and contents shown in the accompanying drawings, but the disclosure is not limited to such embodiments.

Hereinafter, the disclosure will be described in detail with reference to the accompanying drawings.

The disclosure has been made to solve the aforementioned problems and an object of the disclosure is to provide an air conditioning device that is able to provide a pleasant environment for a user by purifying the indoor air, before a user arrives a house, and a control method thereof.

Figure 1:
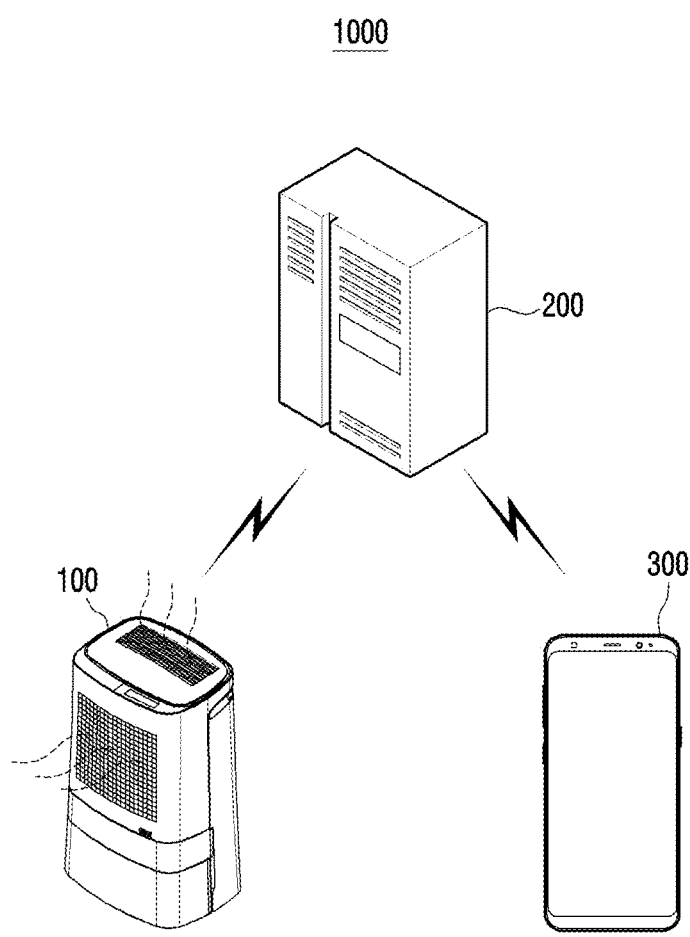
FIG. 1 illustrates a view for describing an air conditioning system 1000 according to an embodiment.

FIG. 1 illustrates a view for describing an air conditioning system 1000 according to an embodiment of the disclosure.

Referring to FIG. 1, the air conditioning system 1000 according to an embodiment of the disclosure may include an air conditioning device 100, a server 200, and an electronic device 300.

The air conditioning device 100 may be an air purifier as shown in FIG. 1 which is an electronic device executing purification of the air. However, this is merely an embodiment, and the air conditioning device 100 may be implemented as various electronic devices executing purifying functions (e.g., air conditioner, a cooler, a heater, a humidifier, and the like).

The air conditioning device 100 may transmit and receive various pieces of data by executing communication with the server 200. In particular, the air conditioning device 100 may receive entry information indicating that the electronic device 300 has entered a predetermined region or an air pollution level state information providing request from the server 200.

Specifically, when the electronic device 300 enters a predetermined region with respect to the air conditioning device 100, the electronic device 300 may transmit the entry information described above to the server 200. The predetermined region herein may be referred to as a geofence region which is a region within a predetermined radius from the air conditioning device 100.

In an embodiment, the geofence region may be a region within a 1-km radius from the air conditioning device 100 but is not limited thereto. The radius of the geofence region may be variously set at a product producing stage and may be variously set or changed according to user instructions. In addition, the geofence region may have a circular shape and various other shapes such as polygon.

In addition, the geofence region may be set with respect to the air conditioning device 100 or may be set with respect to a location determined based on a user input.

For this, information regarding the geofence region may be stored in the electronic device 300 in advance. This will be described in detail with reference to FIGS. 5A to 5D.

The electronic device 300 may be a mobile device such as a smartphone. However, there is no limitation thereto, and the electronic device 300 may be various electronic devices capable of determining location of the electronic device 300 through GPS signals or the like, such as a smart watch or Galaxy Gear.

In addition, it is described herein that the electronic device 300 transmits the entry information to the server 200, but the electronic device 300 may transmit location information of the electronic device 300 to the server 200. In this case, the server 200 may determine whether or not the electronic device 300 has entered the geofence region based on the location information of the electronic device 300. For this, information regarding the geofence region may be stored in the server 200 in advance. Hereinafter, for convenience of description, the description will be made assuming that the electronic device 300 transmits the entry information to the server 200.

When the entry information is received from the electronic device 300, the server 200 may determine a driving state of the air conditioning device 100. The driving state herein may be one of a state where the air conditioning device 100 is driving an air purifier (e.g., fan) for purifying the air or a state where the air conditioning device 100 is not driving the air purifier.

Specifically, when the entry information is received from the electronic device 300, the server 200 may determine the driving state of the air conditioning device 100 based on the information regarding the driving state of the air conditioning device 100 stored in advance. For this, the server 200 may periodically receive the information regarding the driving state of the air conditioning device 100 from the air conditioning device 100 and store the information regarding the driving state of the air conditioning device 100. In addition, when a user instruction (e.g., turn-on instruction) for controlling the air conditioning device 100 is input to the air conditioning device 100, the server 200 may receive the information regarding the driving state of the air conditioning device 100 from the air conditioning device 100 and store the information regarding the driving state of the air conditioning device 100.

If it is determined that the air conditioning device 100 is not driven, the server 200 may transmit the entry information received from the electronic device 300 to the air conditioning device 100. In addition, if it is determined that the air conditioning device 100 is not driven, the server 200 may transmit an air pollution level state information providing request to the air conditioning device 100.

When the entry information or the air pollution level state information providing request is received, the air conditioning device 100 may activate a sensor while maintaining an off state of power, and measure an air pollution level through the sensor. The off state of power herein means a state where an air purifier 120 is not driven. The air pollution level may be a concentration of fine dust in the air. In an example, the air conditioning device 100 may measure a concentration of fine dust having a diameter equal to or less than 10 μm through a PM10 sensor.

The air conditioning device 100 may transmit information indicating that the air conditioning device 100 needs to be driven to the server 200 based on the air pollution level measured by the sensor.

For this, the air conditioning device 100 may determine whether or not the air pollution level measured by the sensor is equal to or higher than a threshold value. The threshold value may be a predetermined value in the air conditioning device 100. In an example, the threshold value of the concentration of the fine dust measured through the PM10 sensor may be 80 μm/m$^3$.

When it is determined that the air pollution level measured by the sensor is equal to or higher than the threshold value, the air conditioning device 100 may transmit information indicating that the air conditioning device 100 needs to be driven to the server 200. That is, the air conditioning device 100 may transmit a notification related to the pollution level to the electronic device 300. Specifically, the air conditioning device 100 may transmit a signal requesting transmission of a notification related to the pollution level to the electronic device 300, to the server 200 and the server 200 may transmit the notification related to the pollution level to the electronic device 300 in response to the signal received from the air conditioning device 100.

The notification may include at least one of entry information indicating that the electronic device 300 has entered the geofence region, information regarding a pollution level measured by the sensor, and a menu for controlling the air conditioning device.

For example, when it is determined that the concentration of fine dust measured through the PM10 sensor is equal to or higher than 80 μm/m$^3$, the air conditioning device 100 may transmit a notification including a message such as "You have approached near to your destination. The level of indoor fine dust is "bad". Please turn on air purifier" and the menu for controlling the air conditioning device 100 to the electronic device 300.

Then, the air conditioning device 100 may receive a signal for driving the air purifier. Specifically, when a user instruction for driving the air purifier of the air conditioning device 100 is input to the electronic device 300, the electronic device 300 may transmit the signal for driving the air purifier to the server 200 and the air conditioning device 100 may receive the signal for driving the air purifier from the server 200.

When the signal for driving the air purifier is received, the air conditioning device 100 may drive the air purifier.

As described above, in the disclosure, a pleasant indoor environment may be provided for a user when the user arrived a house, by driving the air purifier of the air conditioning device 100 based on that the electronic device 300 has entered the geofence region.

Figure 2:
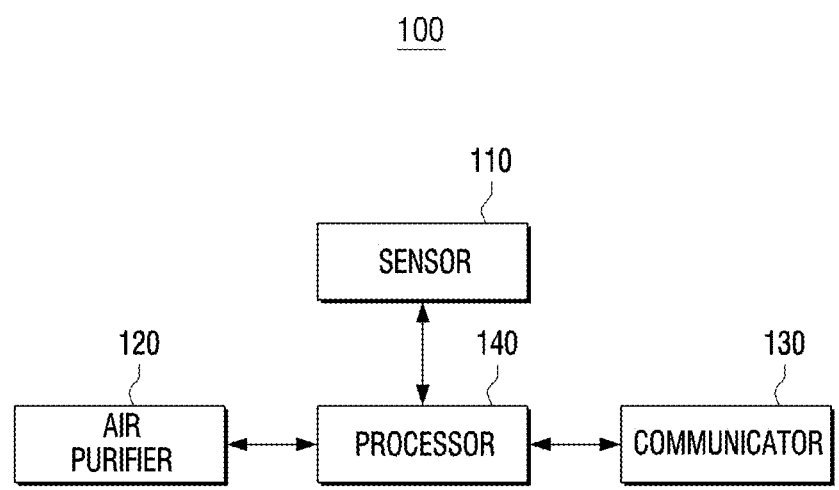
FIG. 2 illustrates a block diagram for describing an air conditioning device 100 according to an embodiment.

FIG. 2 illustrates a block diagram for describing the air conditioning device 100 according to an embodiment of the disclosure.

Referring to FIG. 2, the air conditioning device 100 according to an embodiment of the disclosure includes a sensor 110, an air purifier 120, a communicator 130, and a processor 140.

The sensor 110 may measure an air pollution level. The air pollution level may be a concentration of fine dust.

In an example, the sensor 110 may measure a concentration of fine dust in the air by using the principle of light scattering. Specifically, the sensor 110 may emit light into the air and measure the concentration of fine dust in the air by measuring an amount of light reflected or scattered by fine dust in the air. Alternatively, the sensor 110 may emit light into the air and measure the concentration of fine dust in the air based on a change in index of refraction of air generated due to absorption of light by fine dust in the air. However, this is merely an embodiment, and the sensor 110 may be implemented as various sensors (infrared sensor, laser sensor, and the like) that is able to measure the concentration of fine dust in the air.

The sensor 110 may include a plurality of sensors which are able to measure the concentrations of fine dust having different sizes. Specifically, the sensor 110 may include first to third sensors; in which the first sensor may be a PM10 sensor that is able to measure a concentration of fine dust having a diameter equal to or less than 10 μm, the second sensor may be a PM2.5 sensor that is able to measure a concentration of fine dust having a diameter equal to or less than 2.5 μm, and the third sensor may be a PM1.0 sensor that is able to measure a concentration of fine dust having a diameter equal to or less than 1.0 μm. That is, the sensor 110 may include a plurality of sensors measuring the same type of pollution level (e.g., concentration of fine dust) based on different criteria (e.g., sizes of fine dust).

In addition, the sensor 110 may further include a sensor (e.g., gas sensor) that is able to measure a concentration of carbon dioxide in the air. Specifically, the sensor 110 may further include a sensor that is able to measure an amount of carbon dioxide adsorbed to a periphery of a carbon dioxide adsorption filter (e.g., both edges of the carbon dioxide adsorption filter) of the air conditioning device 100. In this case, the air pollution level according to the disclosure may be a concentration of carbon dioxide in the air. That is, the sensor 110 may include a plurality of sensors measuring various types of pollution levels (e.g., concentration of fine dust and concentration of carbon dioxide).

In addition, the sensor 110 may further include at least one of a temperature sensor and a humidity sensor.

The air purifier 120 may execute purification of the indoor air. For this, the air purifier 120 may include a fan for drawing the air and a filter for purifying the air. The filer is a component for filtering out the drawn air and may include, for example, a pre-filter, a functional filter, a HEPA filter, a deodorizing filter, a carbon dioxide adsorption filter, and the like. The air purifier 120 will be described later in detail with reference to FIG. 3.

The communicator 130 may transmit and receive various pieces of information by executing communication with various external devices.

In particular, the communicator 130 may receive various pieces of information (e.g., entry information indicating that the electronic device 300 has entered the geofence region, air pollution level state information providing request, information related to control of the air conditioning device 100, and the like) from the server 200 and may transmit various pieces of information (e.g., information related to the air pollution level, information related to state information of the air conditioning device 100, and the like) to the server 200, by executing the communication with the server 200.

In addition, the communicator 130 may receive various pieces of information (e.g., information related to control of the air conditioning device 100, and the like) from the electronic device 300 and transmit various pieces of information (e.g., identification information of the air conditioning device 100, and the like) to the electronic device 300, by executing the communication with the electronic device 300.

For this, the communicator 130 may include a wireless communication chip, a Wi-Fi chip, a Bluetooth chip, and the like.

The processor 140 is a component for controlling general operations of the air conditioning device 100. The processor 140 may control a plurality of hardware or software components connected to the processor 140 by running an operating system or an application and may execute various data processing and calculation. For this, the processor 140 may include at least one of a central processing unit (CPU), an application processor (AP), or a communication processor (CP). In addition, the processor 140 may be implemented as at least one of a general processor, a digital signal processor, an application specific integrated circuit (ASIC), a system on chip (SoC), and a Microcomputer (MICOM).

The processor 140 may receive the entry information or the air pollution level state information providing request from the server 200 via the communicator 130. The entry information may include information indicating that the electronic device 300 has entered a predetermined region (that is, geofence region) with respect to the air conditioning device 100. The air pollution level state information providing request may be a signal requesting the measurement of the air pollution level surrounding the air conditioning device 100.

Specifically, the electronic device 300 may periodically determine a location of the electronic device 300 through a GPS signal or the like and, when it is determined that the electronic device 300 has entered the geofence region, the electronic device 300 may transmit the entry information to the server 200. The processor 140 may receive the entry information or the air pollution level state information providing request from the server 200 via the communicator 130.

The entry information or the air pollution level state information providing request may be received from the server 200 via the communicator 130, when the electronic device enters the geofence region while the air purifier 120 is not driven.

Specifically, when the entry information is received from the electronic device 300, the server 200 may first determine a driving state of the air conditioning device. When it is determined that the air conditioning device 100 is driving the air purifier 120 for purification of the air, the server 200 may not transmit the entry information or the air pollution level state information providing request to the air conditioning device 100, and when it is determined that the air conditioning device 100 is not driving the air purifier 120, the server 200 may transmit the entry information or the air pollution level state information providing request to the air conditioning device 100. This is because there is no need to transmit the notification including the menu for driving the air conditioning device 100 to the electronic device 300, when the air conditioning device 100 is driving the air purifier 120. Accordingly, it is possible for the air conditioning device 100 of the disclosure to prevent waste of electric power and unnecessary loads on the processor by preventing the entry information or the air pollution level state information providing request from being unnecessarily received from the server 200.

When the entry information or the air pollution level state information providing request is received, the processor 140 may activate the sensor 110. That is, when the entry information or the air pollution level state information providing request is received, the processor 140 may activate the sensor 110 in an inactivated state. As described above, in the disclosure, the power may be efficiently used by maintaining an inactivated state of the sensor 110 until the entry information or the air pollution level state information providing request is received.

When the air pollution level is measured by the activated sensor 110, the processor 140 may determine whether or not the measured air pollution level is equal to or higher than a threshold value. For example, when a threshold value of the concentration of fine dust measured through the PM10 sensor is set as 80 $\mu m/m^3$ in advance, the processor 140 may determine whether or not the concentration of fine dust measured by the PM10 sensor is equal to or higher than 80 $\mu m/m^3$.

As described above, the sensor 110 according to an embodiment of the disclosure may include a plurality of sensors which are able to measure the concentrations of fine dust having different sizes. For example, the sensor 110 may include a first and second sensors; in which the first sensor may be a PM10 sensor that is able to measure a concentration of fine dust having a diameter equal to or less than 10 $\mu m$ and the second sensor may be a PM2.5 sensor that is able to measure a concentration of fine dust having a diameter equal to or less than 2.5 $\mu m$.

In this case, the processor 140 may determine whether or not a plurality of pollution levels measured by the plurality of sensors are equal to or higher than threshold values based on threshold values differently set for the plurality of sensors, respectively. For example, when the threshold value set for the PM10 sensor is 80 $\mu m/m^3$ and the threshold value set for the PM2.5 sensor is 35 $\mu m/m^3$, the processor 140 may determine whether or not the concentration of fine dust measured by the PM10 sensor is equal to or higher than 80 $\mu m/m^3$ and determine whether or not the concentration of fine dust measured by the PM2.5 sensor is equal to or higher than 35 $\mu m/m^3$.

Such sensors are merely an embodiment, and the disclosure may further include a PM1.0 sensor that is able to measure a concentration of fine dust having a diameter equal to or less than 1.0 $\mu m$. In addition, the same threshold value may be set for some of the plurality of sensors. For example, the threshold value set for the PM2.5 sensor and the PM1.0 sensor may be 35 $\mu m/m^3$ and the threshold value set for the PM10 sensor may be 80 $\mu m/m^3$.

In addition, as described above, the sensor 110 according to an embodiment of the disclosure may further include a sensor (e.g., gas sensor) that is able to measure a concentration of carbon dioxide in the air.

In this case, the processor 140 may determine whether or not a plurality of pollution levels measured by the plurality of sensors are equal to or higher than threshold values, based on threshold values differently set for the plurality of sensors, respectively. For example, when the threshold value set for the PM10 sensor is 80 $\mu m/m^3$ and the threshold value set for the gas sensor is 1,000 ppm, the processor 140 may determine whether or not the concentration of fine dust measured by the PM10 sensor is equal to or higher than 80

μm/m³ and determine whether or not the concentration of carbon dioxide measured by the gas sensor is equal to or higher than 1,000 ppm.

When it is determined that the air pollution level measured by the sensor 110 is equal to or higher than a threshold value, the processor 140 may transmit the notification related to the pollution level of the electronic device 300. Specifically, the processor 140 may transmit the notification related to the pollution level to the server 200 via the communicator 130 and the electronic device 300 may receive the notification related to the pollution level from the server 200.

The notification herein may include at least one of the entry information indicating that the electronic device 300 has entered the geofence region, the information regarding the pollution level measured by the sensor 110, and the menu for controlling the air purifier 120. For example, the notification may include a message such as "You have approached near to your destination. The level of indoor fine dust is "bad". Please turn on air purifier" and the menu for controlling the air conditioning device 100.

When the sensor 110 of the disclosure is implemented as the plurality of sensors, if it is determined that at least one of the plurality of pollution levels measured by the plurality of sensors is equal to or higher than the threshold value, the processor 140 may transmit the notification to the electronic device 300. For example, in the embodiment described above, when the concentration of fine dust measured by the PM10 sensor is lower than 80 μm/m³ but the concentration of fine dust measured by the PM2.5 sensor is equal to or higher than 35 μm/m³, the processor 140 may transmit notification to the electronic device 300. In addition, when the concentration of carbon dioxide measured by the gas sensor is lower than 1,000 ppm but the concentration of fine dust measured by the PM10 sensor is equal to or higher than 80 μm/m³, the processor 140 may transmit the notification to the electronic device 300.

Then, when the signal for driving the air purifier 120 is received via the communicator 130, the processor 140 may drive the air purifier 120.

Specifically, when the electronic device 300 receives a user input for driving the air purifier 120 of the air conditioning device 100, the electronic device 300 may transmit the signal for driving the air purifier 120 to the server 200 and the processor 140 may receive the signal for driving the air purifier 120 from the server 200. The user instruction for driving the air purifier 120 may be received by selecting the menu for controlling the air purifier 120 included in the notification.

As described above, in the disclosure, a pleasant indoor environment may be provided for a user when the user arrived a house, by driving the air purifier of the air conditioning device 100 based on that the electronic device 300 has entered the geofence region.

The processor 140 may control the air purifier 120 at different strength depending on a degree of the pollution level measured by the sensor 110.

Specifically, when it is determined that the pollution level measured by the sensor 110 is equal to or higher than a first threshold value, the processor 140 may drive the air purifier 120 with first strength in response to a signal received from the electronic device 300, and when it is determined that the pollution level measured by the sensor 110 is lower than the first threshold value and equal to or higher than the second threshold value, the processor 140 may drive the air purifier 120 with second strength that is lower than the first strength in response to a signal received from the electronic device 300.

For example, 150 μm/m³ and 80 μm/m³ may be respectively predetermined as the first threshold value and the second threshold value for the PM10 sensor. In this case, when it is determined that the concentration of fine dust measured by the PM10 sensor is 180 μm/m³ which is equal to or higher than the first threshold value, the processor 140 may drive the air purifier 120 with the first strength (for example, strength corresponding to a power mode) in response to a signal received from the electronic device 300, and when it is determined that the concentration of fine dust measured by the PM10 sensor is 100 μm/m³ which is lower than the first threshold value and equal to or higher than the second threshold value, the processor 140 may drive the air purifier 120 with second strength (for example, strength corresponding to a normal mode) that is lower than the first strength in response to a signal received form the electronic device 300.

The processor 140 may also receive deviation information indicating that the electronic device 300 has deviated from the geofence region via the communicator 130.

Specifically, when the electronic device 300 in the geofence region has deviated from the geofence region, the electronic device 300 may transmit the deviation information to the server 200 and the processor 140 may receive the deviation information from the server 200.

In this case, the processor 140 may transmit a notification related to the deviation to the electronic device 300. Specifically, the processor 140 may transmit the notification related to the deviation to the server 200 via the communicator 130 and the electronic device 300 may receive the notification related to the deviation from the server 200. The notification related to the deviation herein may include at least one of the deviation information indicating that the electronic device 300 has deviated from the geofence region and a menu for controlling the air purifier 120. For example, the notification related to the deviation may include a message such as "You are away from air purifier. Do you want to turn off air purifier for energy saving?" and a menu for controlling the air conditioning device 100.

Then, when a signal for stopping the driving of the air purifier 120 is received, the processor 140 may stop the driving of the air purifier 120. Therefore, in the disclosure, it is possible to prevent unnecessary waste of electric power.

The processor 140 may also determine whether or not to transmit the notification related to the deviation based on an operation mode of the air conditioning device 100.

Specifically, when the deviation information is received via the communicator 130, the processor 140 determines the operation mode of the air conditioning device 100. When the air conditioning device 100 is operated in a normal mode, the processor 140 may continue driving the air purifier 120 in the normal mode without transmission of the notification, and when the air conditioning device 100 is operated in a power saving mode in which the air conditioning device 100 is operated with lower power than in the normal mode, the processor 140 may transmit the notification related to the deviation to the electronic device 300, and when a signal for stopping the driving of the air purifier 120 is received, the processor 140 may stop the driving of the air purifier 120.

This is performed in consideration of the intension of a user. This is because that, if the operation mode of the air conditioning device 100 is set as the normal mode, a user has intention of generally continuously purifying the indoor air, and if the operation mode of the air conditioning device 100 is set as the power saving mode, a user has intention of generally purifying the indoor air with low power, only if it is necessary.

Figure 3:
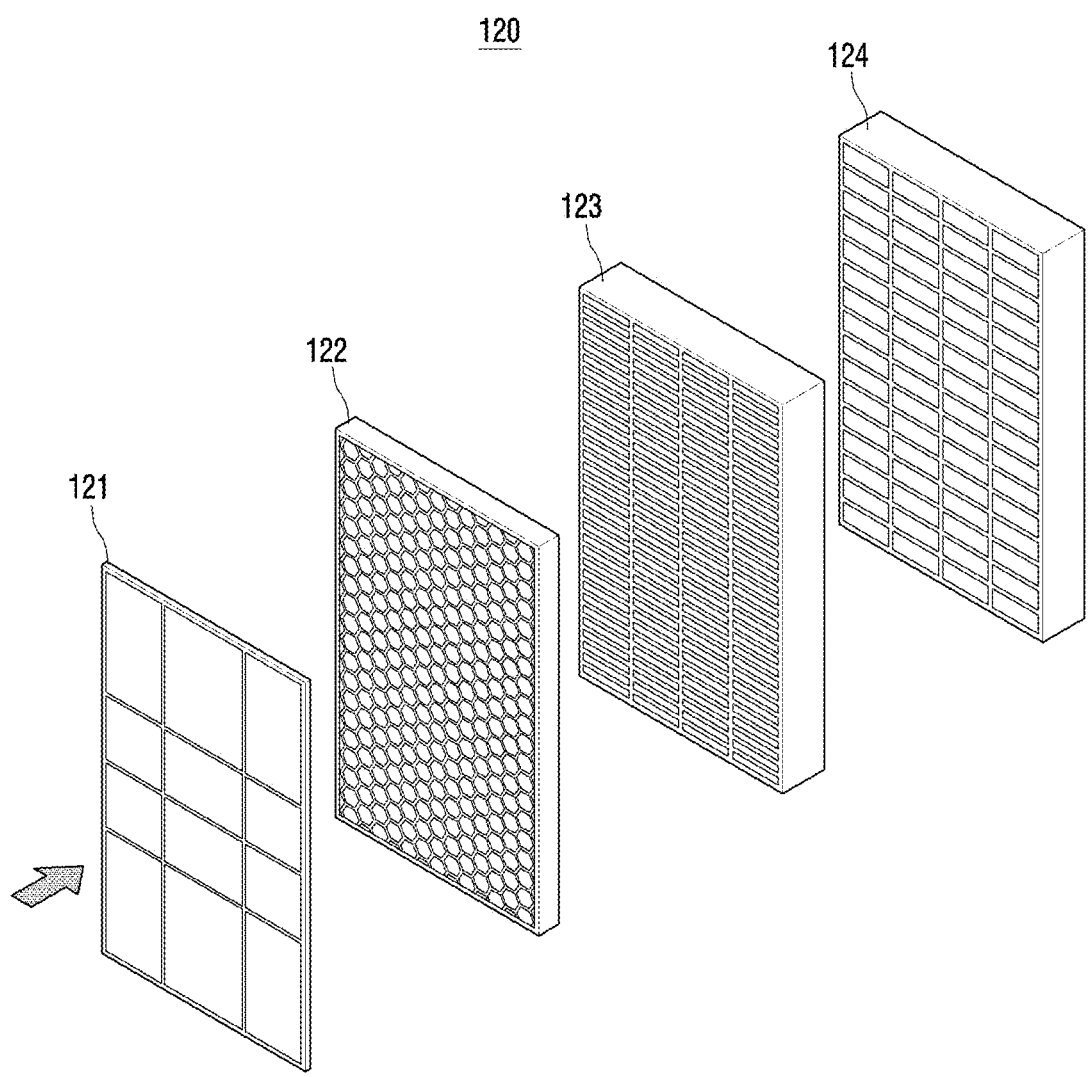
FIG. 3 illustrates a view for describing an air purifier according to an embodiment.

FIG. 3 illustrates a view for describing the air purifier according to an embodiment of the disclosure.

Referring to FIG. 3, the air purifier 120 according to an embodiment of the disclosure may include a pre-filter 121, a deodorizing filter 122, a HEPA filter 123, and a carbon dioxide adsorption filter 124. The pre-filter 121 may be a filter for removing house dust in the air, the deodorizing filter 122 may be a filter for removing various odors and harmful gases in the air, the HEPA filter 123 may be a filter for removing fine dust in the air, and the carbon dioxide adsorption filter 124 may be a filter for removing carbon dioxide in the air.

In particular, the HEPA filter may be a filter formed of a glass fiber or the like and a fiber interval may be 0.5 to 2.0 μm. The fine dust included in the air absorbed through a fan of the air conditioning device 100 may be filtered out by passing through the HEPA filter through operations such as diffusion, interception, inertial impaction, electrostatic attraction, and the like.

The carbon dioxide adsorption filter may be implemented with at least one material among zeolites, metal organic framework (MOF), covalent organic framework (COF), covalent organic polymer (COP).

The pre-filter 121, the deodorizing filter 122, the HEPA filter 123, and the carbon dioxide adsorption filter 124 may be sequentially disposed based on a direction in which the air is absorbed. In an example, as shown in FIG. 3, if the air is absorbed from left to right, the pre-filter 121, the deodorizing filter 122, the HEPA filter 123, and the carbon dioxide adsorption filter 124 may be sequentially disposed from the left in the air purifier 120. However, this is merely an embodiment, and if the air is absorbed from bottom to top, the pre-filter 121, the deodorizing filter 122, the HEPA filter 123, and the carbon dioxide adsorption filter 124 may be sequentially disposed from the bottom in the air purifier 120.

Figure 4:
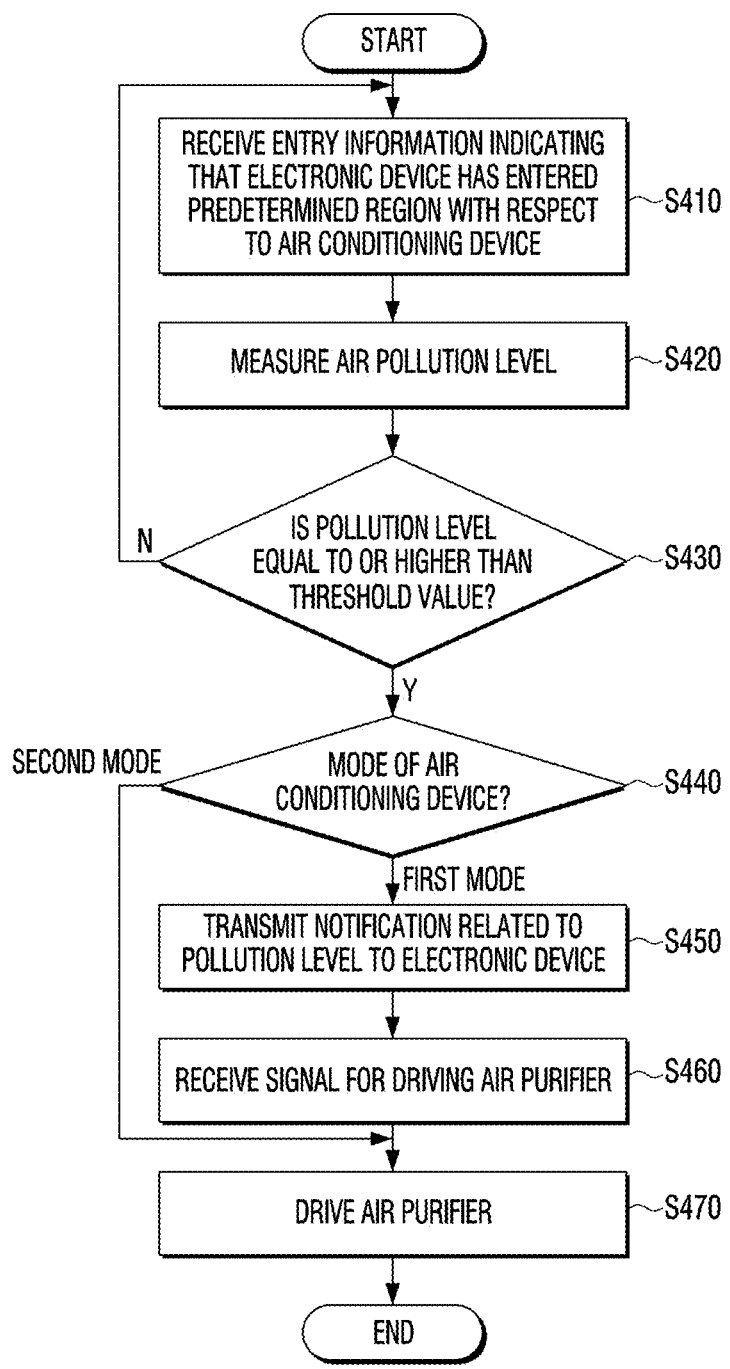
FIG. 4 illustrates a flowchart for describing an air conditioning device executing different operations according to operation modes according to an embodiment.

FIG. 4 illustrates a flowchart for describing the air conditioning device executing different operations according to the operation modes according to an embodiment of the disclosure. Hereinafter, the overlapped part of the above description will be omitted or briefly described.

When the electronic device 300 has entered the geofence region, the processor 140 may receive an air pollution level state information providing request or entry information indicating that the electronic device 300 has entered the geofence region (S410). The processor 140 may activate the sensor 110 based on the reception of the air pollution level state information providing request or the entry information and measure an air pollution level through the sensor 110 (S420).

The processor 140 may determine whether or not the air pollution level is equal to or higher than a threshold value, and when it is determined that the air pollution level is equal to or higher than the threshold value, the processor 140 may determine the mode of the air conditioning device 100 (S440).

When it is determined that the air pollution level state information providing request or the entry information is received while the air conditioning device 100 is operated in a first mode, the processor 140 may transmit a notification related to the pollution level to the electronic device 300 (S450). The first mode may be a mode in which the air purifier 120 is driven (S470) based on reception of a user instruction for driving the air purifier 120 (S460).

When it is determined that the air pollution level state information providing request or the entry information is received while the air conditioning device 100 is operated in a second mode, the processor 140 may automatically drive the air purifier 120 (S470) without transmission of the notification related to the pollution level.

The mode of the air conditioning device 100 may be set or changed according to a user instruction. Specifically, when a user instruction for setting the mode of the air conditioning device 100 as one of the first and second modes is received, the electronic device 300 may transmit a signal for setting the air conditioning device 100 in a mode corresponding to the user instruction to the air conditioning device 100, and the air conditioning device 100 may set the mode of the air conditioning device 100 as one of the first and second modes based on the signal received from the electronic device 300. In addition, the electronic device 300 may transmit the signal for setting the air conditioning device 100 in a mode corresponding to the user instruction to the server 200, and the air conditioning device 100 may set the mode of the air conditioning device 100 as one of the first and second modes based on the signal received from the server 200.

Figure 5A:
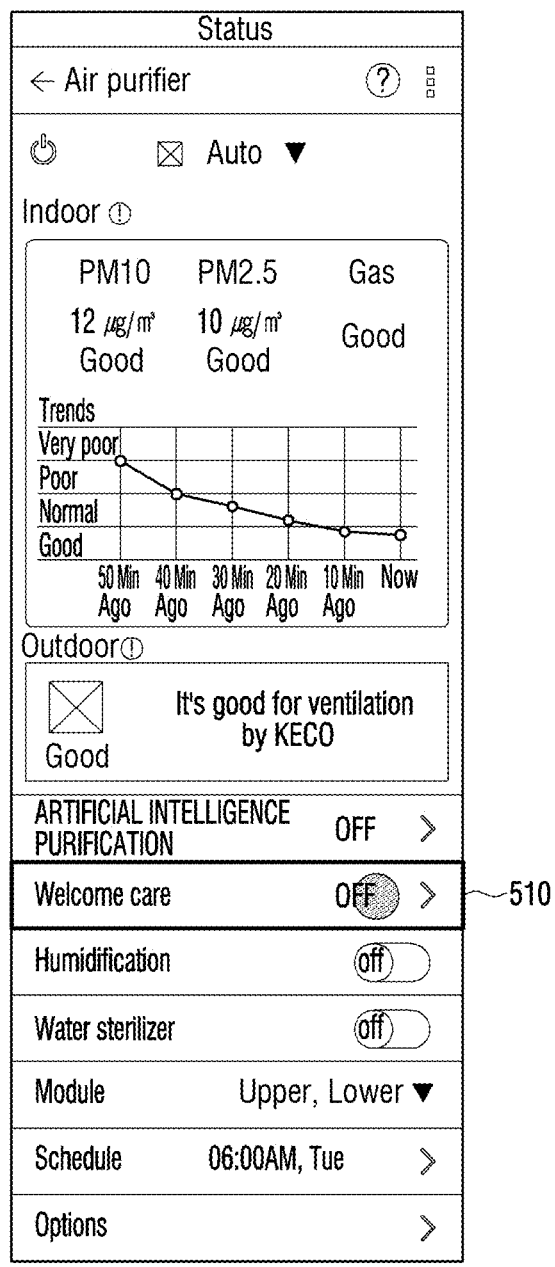
FIG. 5A illustrates a view showing a screen displaying state information and a menu related to setting of the air conditioning device according to an embodiment.
Figure 5B:
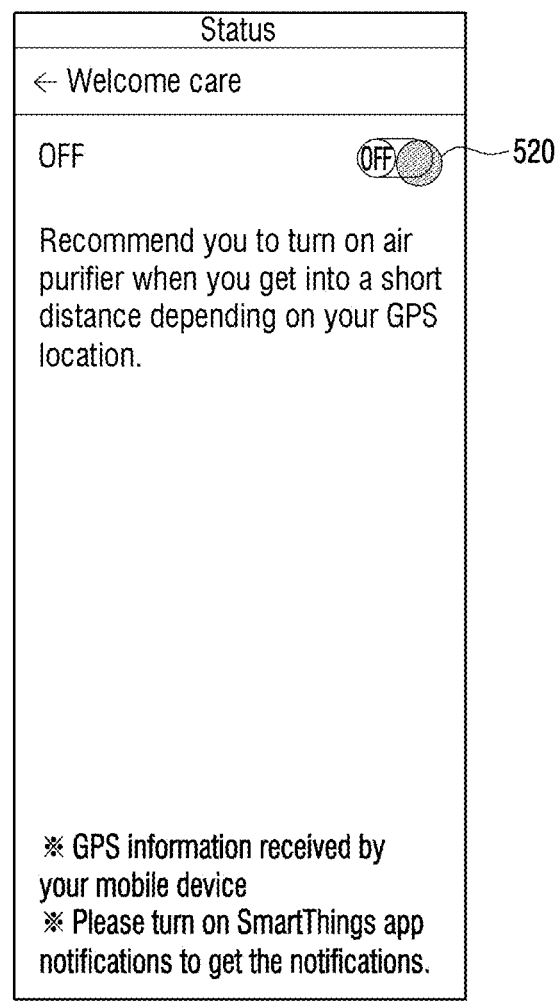
FIG. 5B illustrates a view showing a screen for activating a geofence function according to an embodiment.
Figure 5C:
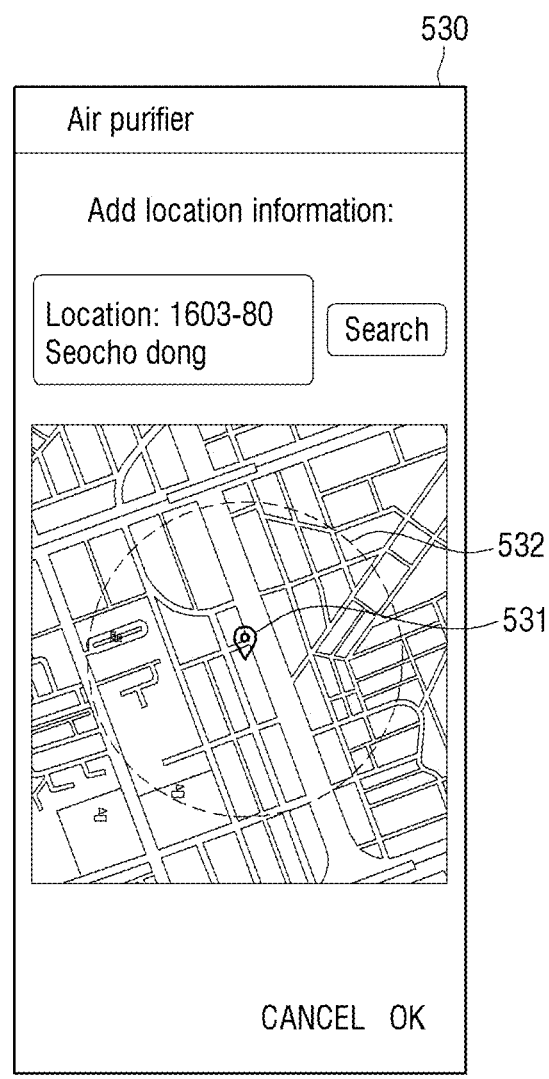
FIG. 5C illustrates a view for describing an example of setting a geofence region according to an embodiment.
Figure 5D:
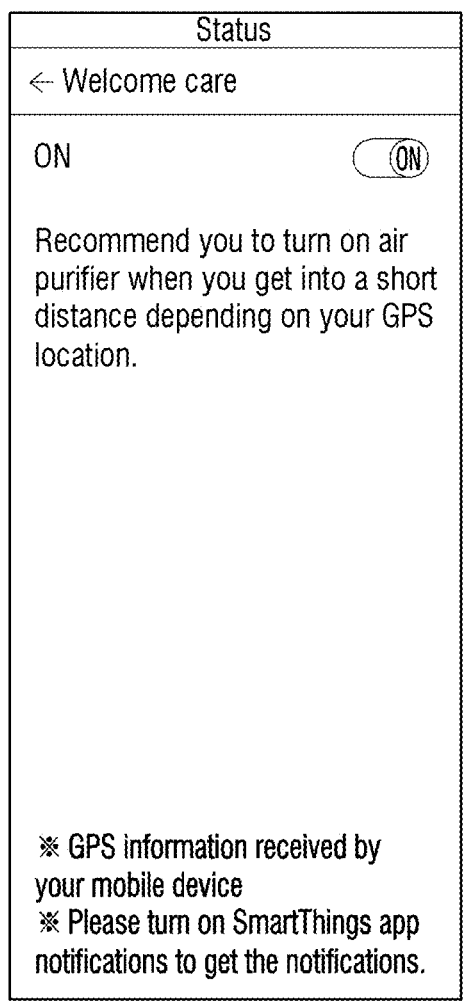
FIG. 5D illustrates a view showing a screen displaying that the geofence function is activated according to an embodiment.

FIGS. 5A and 5D illustrate views for describing a method for setting a geofence region according to an embodiment of the disclosure.

When a user instruction for displaying state information of the air conditioning device 100 is received, the electronic device 300 may display state information including driving state information of the air conditioning device 100 and air pollution levels measured by the air conditioning device 10, and a menu related to setting of the air conditioning device, as shown in FIG. 5A. Specifically, when a user instruction for displaying the state information of the air conditioning device 100 is received, the electronic device 300 may transmit a signal requesting the state information of the air conditioning device 100 to the server 200 and the server 200 may transmit the state information of the air conditioning device 100 received from the air conditioning device 100 to the electronic device 300. In addition, the electronic device 300 may transmit the signal requesting the state information of the air conditioning device 100 to the air conditioning device 100 and receive the state information of the air conditioning device 100 from the air conditioning device 100.

When a user instruction for selecting a menu 510 for setting a Welcome care menu of the air conditioning device 100 is received, the electronic device 300 may display a screen related to the Welcome care menu setting, as shown in FIG. 5B. The Welcome care menu 510 may be a menu for setting so that the electronic device 300 receives a notification transmitted by the air conditioning device 100, when the electronic device 300 enters the geofence region.

Herein, when a user instruction for selecting the Welcome care menu 510 is received, the electronic device 300 may display a screen for activating a Welcome care function, as shown in FIG. 5B. This screen may include a guide message such as "Recommend you to turn on air purifier if degree of fine dust is "bad" when you get into a short distance to the air purifier".

When a user instruction 520 for activating the Welcome care function is received, the electronic device 300 may display a screen 530 for setting the geofence region, as shown in FIG. 5C. The screen displayed herein may be a pop-up screen or a screen transitioned from the screen for activating the Welcome care function.

When a user instruction for registering a location of the air conditioning device 100 is received through the screen 530 for setting the geofence region, the electronic device 300 may set a region within a predetermined radius from the air conditioning device 100 as the geofence region. Specifically, the electronic device 300 may acquire location information of the air conditioning device 100 based on an address input to the screen 530 for setting the geofence region, and set a region within a predetermined radius with respect to a location 531 of the air conditioning device 100 as a geofence region 532. The radius may be 1 km, but this is merely an embodiment, and the radius may be variously set or changed according to user instructions.

Although not shown in FIG. 5C, the screen for setting the geofence region may further include a message such as "Please register location of air purifier".

Then, when a user instruction for completing the setting of the geofence region is received, the electronic device 300 may display a screen showing that the Welcome care function is activated, as shown in FIG. 5D.

Hereinabove, an embodiment of setting the region within a predetermined radius from the air conditioning device 100 as the geofence region has been described, but the geofence region may be variously set according to user instructions. In an example, when a user inputs a second location on a screen 540 for setting the geofence region, while the air conditioning device 100 is present at the first location, the electronic device 300 may set the region within a predetermined radius from the second location as the geofence region.

In addition, the electronic device 300 may set a plurality of geofence regions. For this, the electronic device 300 may display a screen for setting the geofence region, including more menus for adding a geofence region.

In addition, when a plurality of geofence regions are set, the electronic device 300 may variously set the air conditioning device corresponding to each geofence region. For example, when the electronic device enters a first geofence region, the electronic device may be set to receive a notification from a first air conditioning device, and when the electronic device enters a second geofence region, the electronic device may be set to receive a notification from a second air conditioning device.

FIGS. 6A and 6B illustrate views for describing notifications related to an embodiment of the disclosure.

FIG. 6A illustrates a view for describing a notification related to a pollution level according to an embodiment of the disclosure.

Referring to FIG. 6A, the air conditioning device 100 may transmit a notification including a message such as "You have approached near to your destination. The level of indoor fine dust is "bad". Please turn on air purifier" and a menu for controlling the air conditioning device 100 based on the entry information.

When the notification is received, the electronic device 300 may display a notification screen shown in FIG. 6A, and may transmit a signal for driving the air purifier 120 to the server 200, when the menu for driving the air purifier 120 is selected (for example, when a user instruction of touching "OK" of FIG. 6A is received). The air conditioning device 100 may drive the air purifier 120 based on the signal for driving the air purifier 120 received from the server 200.

It is described that the signal for driving the air purifier 120 is transmitted, when the menu included in the notification screen is selected, but this is merely an embodiment. In another example, when the menu included in the notification screen is selected, the electronic device 300 may display a screen for controlling the air conditioning device 100. In this case, when a user instruction for driving the air purifier 120 is received through the screen for controlling the air conditioning device 100, the electronic device 300 may transmit the signal for driving the air purifier 120.

FIG. 6B illustrates a view for describing a notification related to deviation according to an embodiment of the disclosure.

Referring to FIG. 6B, the air conditioning device 100 may transmit a notification including "You are away from air purifier. Do you want to turn off air purifier for energy saving?" and the menu for controlling the air conditioning device 100, based on the deviation information.

When the notification is received, the electronic device 300 may display a notification screen shown in FIG. 6B, and may transmit a signal for stopping the driving of the air purifier 120 to the server 200, when the menu for stopping the driving of the air purifier 120 is selected (for example, when a user instruction of touching "OK" of FIG. 6B is received). The air conditioning device 100 may stop the driving of the air purifier 120 based on the signal for stopping the driving of the air purifier 120 received from the server 200.

It is described that the signal for stopping the driving of the air purifier 120 is transmitted when the menu included in the notification screen is received, but this is merely an embodiment. In another example, when the menu included in the notification screen is selected, the electronic device 300 may display a screen for controlling the air conditioning device 100. In this case, when a user instruction for stopping the driving of the air purifier 120 is received through the screen for controlling the air conditioning device 100, the electronic device 300 may transmit the signal for stopping the driving of the air purifier 120.

Figure 7:
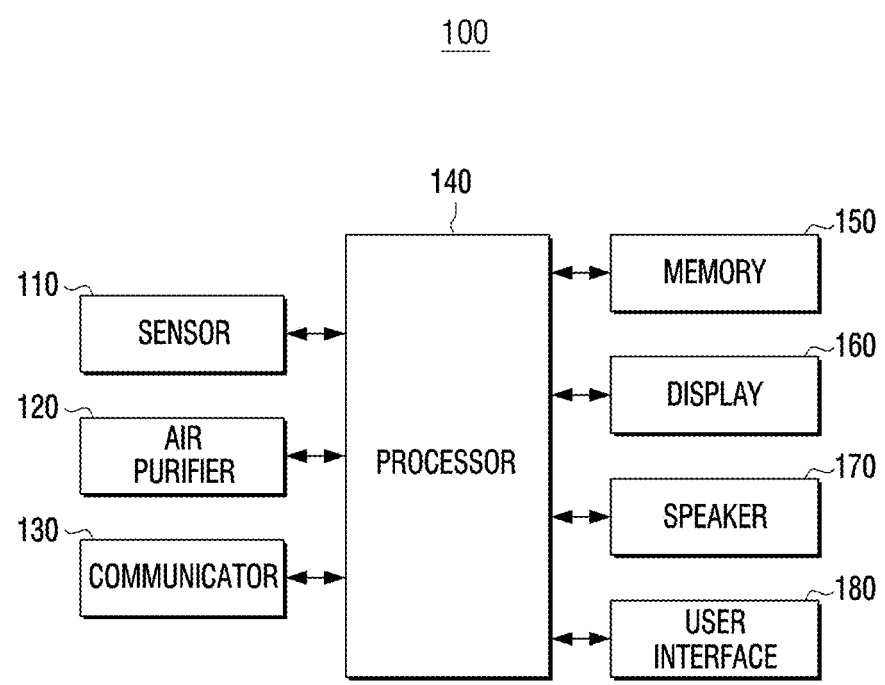
FIG. 7 illustrates a block diagram for specifically describing the air conditioning device according to an embodiment.

FIG. 7 illustrates a block diagram for specifically describing the air conditioning device according to an embodiment of the disclosure.

Referring to FIG. 7, the air conditioning device 100 according to an embodiment of the disclosure may include the sensor 110, the air purifier 120, the communicator 130, a memory 150, a display 160, a speaker 170, a user interface 180, and the processor 140. Hereinafter, the overlapped part of the above description will be omitted or briefly described.

The memory 150 may store instructions or data related to at least another component of the air conditioning device 100. The memory 150 may be implemented as a non-volatile memory, a volatile memory, a flash memory, a hard disk drive (HDD), or a solid-state drive (SSD). The memory 150 may be accessed by the processor 140 and reading, recording, editing, deleting, or updating of the data by the processor 140 may be executed. The term memory of the disclosure may include the memory 150, a ROM (not shown) and a RAM (not shown) in the processor 140, or a memory card (not shown) mounted on the air conditioning device 100 (for example, a micro SD card or a memory stick). In addition, the memory 150 may store programs and data for configuring various screens displayed in a display region of the display 160.

The display 160 may display various pieces of information according to the control of the processor 140. In particular, the display 160 may display information regarding a concentration of fine dust in the air, information regarding a concentration of carbon dioxide in the air, or information regarding an operation currently executed by the air conditioning device 100. The display 160 may be implemented as a touch screen with a touch panel included in the user interface 180.

The speaker 170 may output not only various pieces of audio data obtained by executing various processing such as decoding, amplification, or noise filtering by an audio processor, but also various alerts or voice messages. Particularly, the speaker 170 may output information regarding a concentration of fine dust in the air, information regarding a concentration of carbon dioxide in the air, or information regarding an operation currently executed by the air conditioning device 100 as a voice message in a natural language.

The user interface 180 may receive a user instruction for controlling the air conditioning device 100. In particular, the user interface 180 may include a touch panel for receiving an input by touching with fingers of a user or a stylus pen, a button for receiving an input by manipulation of a user, and the like. In addition, the user interface 180 may be implemented as various input devices (e.g., keyboard, mouse, motion input unit, and the like).

Figure 8:
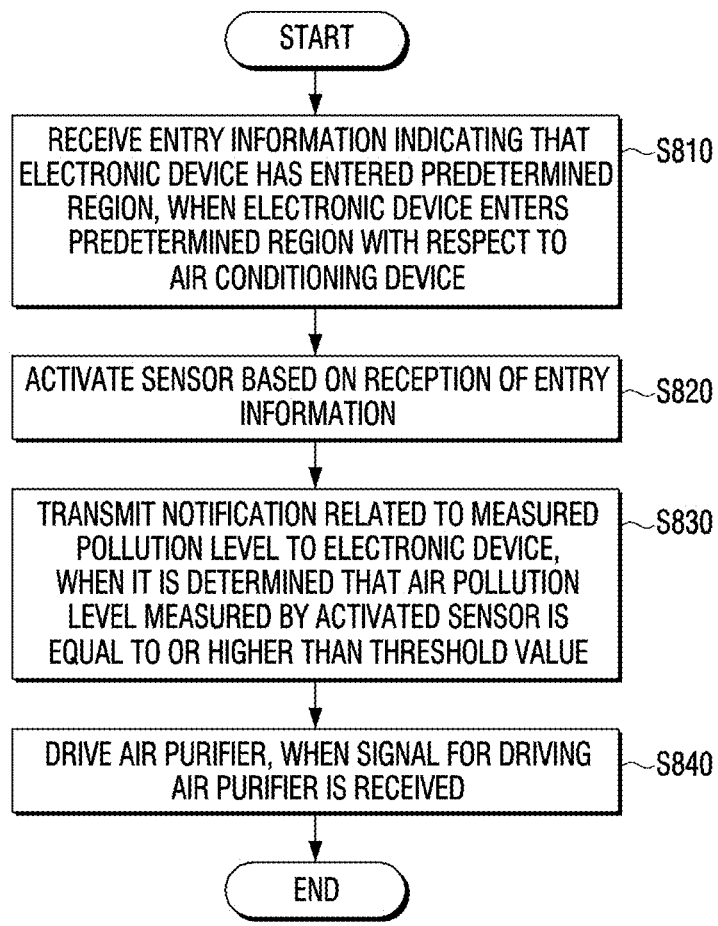
FIG. 8 illustrates a flowchart for describing a method for controlling the air conditioning device according to an embodiment.

FIG. 8 illustrates a flowchart for describing a method for controlling the air conditioning device according to an embodiment of the disclosure.

When an electronic device enters a predetermined region with respect to an air conditioning device, the air conditioning device may receive an air pollution level state information providing request or entry information indicating that the electronic device has entered the predetermined region (S810).

In particular, when the electronic device enters the predetermined region with respect to the air conditioning device while an air purifier is not driven, the air conditioning device may receive the air pollution level state information providing request or the entry information.

The air conditioning device may activate a sensor based on the reception of the air pollution level state information providing request or the entry information (S820). The sensor may be a sensor for measuring a concentration of fine dust in the air.

When it is determined that an air pollution level measured by the activated sensor is equal to or higher than a threshold value, the air conditioning device may transmit a notification related to the measured pollution level to the electronic device (S830). The notification may include at least one of entry information indicating that the electronic device has entered the predetermined region, information regarding the pollution level measured by the sensor, and a menu for controlling the air purifier.

Then, when a signal for driving the air purifier is received, the air conditioning device may drive the air purifier (S840). In particular, the air conditioning device may drive the air purifier based on the air pollution level measured by the sensor. In particular, when the air pollution level measured by the sensor is high, the air conditioning device may drive the air purifier with strong strength and, when the air pollution level measured by the sensor is low, the air conditioning device may drive the air purifier with relatively low strength.

According to the embodiments of the disclosure described above, it is possible to provide the air conditioning device executing purification of the air based on that a user enters a specific region. Therefore, the purified air may be provided for a user when a user arrives a house.

In addition, a user may receive a notification related to the air pollution level and control the air conditioning device at a point when the purification of the air is necessary, and therefore, according to the disclosure, it is possible to prevent inconvenience that a user needs to frequently monitor whether or not the purification of the air is necessary. Further, according to the disclosure, a user may stop the air purification operation when a user is away from a specific region, and therefore it is possible to prevent unnecessary waste of electric power.

Various functions of the server 200 described above may be executed by a communicator and a processor of the server 200.

In an example, the communicator of the server 200 may transmit and receive various pieces of information described above (for example, the air pollution level state information providing request or the like) by executing communication with the air conditioning device 100 and may transmit and receive various information described above (for example, the location information of the electronic device 300 or the like) by executing communication with the electronic device 300. For this, the communicator of the server 200 may include a wireless communication module, a Wi-Fi module, and the like.

When the entry information is received from the electronic device 300, the processor of the server 200 may control the communicator of the server 200 to transmit the air pollution level state information providing request or the entry information to the air conditioning device 100.

The processor of the server 200 may determine the driving state of the air conditioning device 100, and when it is determined that the air conditioning device 100 is not driven, the processor may transmit the air pollution level state information providing request or the entry information to the air conditioning device 100. When information indicating that the air conditioning device 100 needs to be driven is received from the air conditioning device 100, the processor of the server 200 may transmit the information described above to the electronic device 300 and transmit a driving instruction received from the electronic device 300 to the air conditioning device 100.

For this, the processor of the server 200 may include at least one of a central processing unit (CPU), an application processor (AP), or a communication processor (CP). In addition, the processor of the server 200 may be implemented as at least one of a general processor, a digital signal processor, an application specific integrated circuit (ASIC), system on chip (SoC), or a microcomputer (MICOM).

The methods according to the embodiments of the disclosure described above may be implemented in a form of software or applications installable on the existing air conditioning device.

In addition, the methods according to the embodiments of the disclosure described above may be implemented simply by the software upgrade or hardware upgrade in the existing air conditioning device.

Further, the embodiments of the disclosure described above may be executed through an embedded server provided in the air conditioning device or an external server of the air conditioning device.

A non-transitory computer readable medium storing programs sequentially executing the method for controlling the air conditioning device according to the disclosure may be provided.

The non-transitory computer-readable medium is not a medium storing data for a short period of time such as a register, a cache, or a memory, but means a medium that semi-permanently stores data and is readable by a machine. Specifically, the various applications or programs described above may be provided to be stored in the non-transitory readable medium such as a CD, a DVD, a hard disk, a Blu-ray disc, a USB, a memory card, and a ROM.

Although the present disclosure has been described with various embodiments, various changes and modifications may be suggested to one skilled in the art. It is intended that the present disclosure encompass such changes and modifications as fall within the scope of the appended claims.

What is claimed is:

1. An air conditioning device comprising:
   an air purifier;
   a sensor configured to measure an air pollution level;
   a communicator comprising circuitry and configured to communicate with a server; and
   a processor configured to:
      activate the sensor in a state where the air purifier is not driven and the sensor is in an inactivated, reduced power state, in response to receiving a first signal requesting an air pollution level state information from the server based on a location of a mobile terminal while the air purifier is not driven and the sensor is in the inactivated, reduced power state,
      transmit a second signal indicating that the air conditioning device needs to be driven to the server based on the air pollution level measured by the sensor, and
      drive the air purifier with a strength corresponding to the air pollution level in response to a driving instruction received from the server,
      wherein the first signal is received from the server, based on the mobile terminal entering a predetermined region with respect to the air conditioning device.

2. The air conditioning device according to claim 1, wherein:
   the sensor comprises a plurality of sensors configured to measure same type of pollution level based on different criteria, and
   the processor is configured to:
      based on threshold values differently set for the plurality of sensors respectively, determine whether a plurality of pollution levels measured by the plurality of sensors are equal to or higher than the threshold values, and
      based on at least one of the plurality of pollution levels measured by the plurality of sensors being determined to be equal to or higher than at least one of the threshold values, transmit the second signal to the server.

3. The air conditioning device according to claim 1, wherein:
   the sensor comprises a plurality of sensors configured to measure different types of pollution levels, and
   the processor is configured to:
      based on threshold values differently set for the plurality of sensors respectively, determine whether a plurality of pollution levels measured by the plurality of sensors are equal to or higher than the threshold values, and
      based on at least one of the plurality of pollution levels measured by the plurality of sensors being determined to be equal to or higher than at least one of the threshold values, transmit the second signal to the server.

4. The air conditioning device according to claim 1, wherein the processor is configured to:
   based on the measured air pollution level being determined to be equal to or higher than a threshold value while the air conditioning device is driven in a first mode, transmit the second signal to the server, and
   based on the measured air pollution level being determined to be equal to or higher than a threshold value while the air conditioning device is driven in a second mode, automatically drive the air purifier without the transmission.

5. The air conditioning device according to claim 1, wherein the processor is configured to:
   based on deviation information indicating that the mobile terminal deviated from a predetermined region with respect to the air conditioning device being received from the server, transmit a notification related to the deviation information to the mobile terminal, and
   based on a signal for stopping driving of the air purifier being received, stop the driving of the air purifier.

6. The air conditioning device according to claim 5, wherein the processor is configured to:
   based on the deviation information being received from the server, determine an operation mode of the air conditioning device,
   based on the air conditioning device being operated in a normal mode, drive the air purifier according to the normal mode without transmission of the notification,
   based on the air conditioning device being operated in a power saving mode in which the air conditioning device is operated with lower power than in the normal mode, transmit the notification related to the deviation information to the mobile terminal, and
   based on a signal for stopping driving of the air purifier being received, stop the driving of the air purifier.

7. The air conditioning device according to claim 1, wherein the processor is configured to:
   based on the measured air pollution level being determined to be equal to or higher than a first threshold value, drive the air purifier with first strength in response to the driving instruction, and
   based on the measured air pollution level being determined to be lower than the first threshold value and equal to or higher than a second threshold value, drive the air purifier with second strength lower than the first strength in response to the driving instruction.

8. The air conditioning device according to claim 1, wherein the processor is configured to transmit at least one of:
   entry information indicating that the mobile terminal entered a predetermined region,
   information regarding the air pollution level measured by the sensor, and
   a menu for controlling the air purifier to the server.

9. The air conditioning device according to claim 1, wherein the processor is configured to activate the sensor based on the mobile terminal entering a geofence of a predetermined shape.

10. A method for controlling an air conditioning device, the method comprising:
    activating a sensor of the air conditioning device in a state where an air purifier of the air conditioning device is not driven and the sensor is in an inactivated, reduced power state, in response to receiving a first signal requesting an air pollution level state information from a server based on a location of a mobile terminal while the air purifier is not driven and the sensor is in the inactivated, reduced power state;
    transmitting a second signal indicating that the air conditioning device needs to be driven to the server based on an air pollution level measured by the sensor; and
    driving the air purifier with a strength corresponding to the air pollution level in response to a driving instruction received from the server, wherein the first signal is received from the server, based on the mobile terminal entering a predetermined region with respect to the air conditioning device.

11. The method according to claim 10, wherein:
the sensor comprises a plurality of sensors configured to measure same type of pollution level based on different criteria, and
transmitting the second signal comprises:
based on threshold values differently set for the plurality of sensors respectively, determining whether a plurality of pollution levels measured by the plurality of sensors are equal to or higher than the threshold values, and
based on at least one of the plurality of pollution levels measured by the plurality of sensors being determined to be equal to or higher than at least one of the threshold values, transmitting the second signal to the server.

12. The method according to claim 10, wherein:
the sensor comprises a plurality of sensors configured to measure different types of pollution levels, and
transmitting the second signal comprises:
based on threshold values differently set for the plurality of sensors respectively, determining whether a plurality of pollution levels measured by the plurality of sensors are equal to or higher than the threshold values, and
based on at least one of the plurality of pollution levels measured by the plurality of sensors being determined to be equal to or higher than at least one of the threshold values, transmitting the second signal to the server.

13. The method according to claim 10, further comprising:
determining a mode of the air conditioning device; and
based on the measured air pollution level being determined to be equal to or higher than a threshold value while the air conditioning device is driven in a first mode, transmitting the second signal to the server, and
based on the measured air pollution level being determined to be equal to or higher than a threshold value while the air conditioning device is driven in a second mode, automatically driving the air purifier without the transmission.

14. The method according to claim 10, further comprising:
based on deviation information indicating that the mobile terminal deviated from a predetermined region with respect to the air conditioning device being received from the server, transmitting a notification related to the deviation information to the mobile terminal, and
based on a signal for stopping driving of the air purifier being received, stopping the driving of the air purifier.

15. The method according to claim 14, further comprising:
based on the deviation information being received from the server, determining an operation mode of the air conditioning device;
based on the air conditioning device being operated in a normal mode, driving the air purifier according to the normal mode without transmission of the notification;
based on the air conditioning device being operated in a power saving mode in which the air conditioning device is operated with lower power than in the normal mode, transmitting the notification related to the deviation information to the mobile terminal; and
based on a signal for stopping driving of the air purifier being received, stopping the driving of the air purifier.

16. The method according to claim 10, wherein driving the air purifier comprises:
based on the measured air pollution level being determined to be equal to or higher than a first threshold value, driving the air purifier with first strength in response to the driving instruction, and
based on the measured air pollution level being determined to be lower than the first threshold value and equal to or higher than a second threshold value, driving the air purifier with second strength lower than the first strength in response to the driving instruction.

17. The method according to claim 10, wherein transmitting the second signal comprises transmitting at least one of:
entry information indicating that the mobile terminal entered a predetermined region,
information regarding the air pollution level measured by the sensor, and
a menu for controlling the air purifier.

18. The method according to claim 10, wherein the sensor is activated based on the mobile terminal entering a geofence of a predetermined shape.

* * * * *